(12) United States Patent
Messthaler et al.

(10) Patent No.: US 10,551,232 B2
(45) Date of Patent: Feb. 4, 2020

(54) FLOWMETER AND METHOD FOR PRODUCING A FLOWMETER

(71) Applicant: DIEHL METERING GMBH, Ansbach (DE)

(72) Inventors: Roland Messthaler, Windsbach (DE); Markus Eff, Herrieden (DE); Hans-Michael Sonnenberg, Ansbach (DE)

(73) Assignee: Diehl Metering GmbH, Ansbach (DE)

( * ) Notice: Subject to any disclaimer, the term of this patent is extended or adjusted under 35 U.S.C. 154(b) by 0 days.

(21) Appl. No.: 16/112,843

(22) Filed: Aug. 27, 2018

(65) Prior Publication Data
US 2019/0078917 A1 Mar. 14, 2019

(30) Foreign Application Priority Data

Sep. 9, 2017 (DE) .................. 10 2017 008 515
Nov. 7, 2017 (DE) .................. 10 2017 010 282

(51) Int. Cl.
*G01F 1/66* (2006.01)
*G01F 1/42* (2006.01)

(52) U.S. Cl.
CPC .................. *G01F 1/662* (2013.01)

(58) Field of Classification Search
CPC .................. G01F 1/42; G01F 1/66
See application file for complete search history.

(56) References Cited

U.S. PATENT DOCUMENTS

| 8,443,842 | B2 | 5/2013 | Sonnenberg |
| 8,689,638 | B2* | 4/2014 | Shen ............ G01F 1/662 |
| | | | 73/861.25 |
| 9,506,787 | B2* | 11/2016 | Postberg ........ G01F 1/42 |
| 9,541,107 | B2* | 1/2017 | Sawchuk ........ F17D 1/17 |
| 9,625,293 | B2* | 4/2017 | Sawchuk ........ G01F 1/40 |
| 10,260,537 | B2* | 4/2019 | Sawchuk ....... G01F 15/00 |
| 2010/0084034 | A1 | 4/2010 | Sonnenberg |

FOREIGN PATENT DOCUMENTS

| DE | 102008049891 A1 | 6/2010 |
| EP | 0890826 A1 | 1/1999 |
| EP | 1493998 A2 | 1/2005 |
| EP | 1775560 A2 | 4/2007 |
| EP | 2172657 A2 | 4/2010 |

(Continued)

*Primary Examiner* — Jewel V Dowtin
(74) *Attorney, Agent, or Firm* — Laurence A. Greenberg; Werner H. Stemer; Ralph E. Locher (57) ABSTRACT

A flow meter detects a flow rate of a fluid. The flow meter includes a housing having a flow passage, through which the fluid can be guided from an inlet opening of the housing to an outlet opening of the housing, a measuring tube, which is inserted into the flow passage and constricts the flow cross section in one section of the flow passage, and a holding device, by which the measuring tube is retained on the housing. A respective flow straightener having at least one aperture through which the fluid can flow is arranged between the inlet opening and the measuring tube and/or between the measuring tube and the outlet opening. The flow straightener is configured as a separate component part, which is secured on the holding device by a form-locking or force-locking connection.

17 Claims, 3 Drawing Sheets

(56) References Cited

FOREIGN PATENT DOCUMENTS

| | | |
|---|---|---|
| EP | 2267416 A1 | 12/2010 |
| EP | 2278281 A1 | 1/2011 |
| EP | 2423648 A1 | 2/2012 |
| EP | 2565593 A1 | 3/2013 |
| WO | 2017215716 A1 | 12/2017 |

\* cited by examiner

FLOWMETER AND METHOD FOR PRODUCING A FLOWMETER

CROSS-REFERENCE TO RELATED APPLICATION

This application claims the priority, under 35 U.S.C. § 119, of German application DE 10 2017 008 515.3, filed Sep. 9, 2017 and of German application DE 10 2017 010 282.1, filed Nov. 7, 2017; the prior application is herewith incorporated by reference in its entirety.

BACKGROUND OF THE INVENTION

Field of the Invention

The invention relates to a flow meter for detecting a flow rate of a fluid, containing a housing having a flow passage, through which the fluid can be guided from an inlet opening of the housing to an outlet opening of the housing, a measuring tube, which is inserted into the flow passage and constricts the flow cross section in one section of the flow passage, and a holding device, by which the measuring tube is retained on the housing. In addition, the invention relates to a method for producing a flow meter.

A flow rate through a flow passage can be measured by an ultrasonic meter. In this case, two ultrasonic transducers are used, one of which transmits ultrasound waves, which the other receives. By measuring the propagation time of the ultrasound between these ultrasonic transducers or a difference in propagation time between the transmission directions, it is possible to detect a speed of flow and thus also a flow rate if the pipe diameter is known. In order, on the one hand, to achieve a defined flow profile and, on the other hand, to constrict the flow cross section and thus increase the speed of flow within the measurement section, measuring tubes that are inserted into the flow passage are often used. These are configured as separate components which can be inserted into the housing which forms the flow passage. In this case, there is a known practice of securing the measuring tube together with other components on the housing. From published European patent applications EP 2 278 281 A1 and EP 2 423 648 A1, for example, it is known that the measuring tube can first of all be arranged on a support which, in addition to the measuring tube, carries reflectors for applied ultrasound waves, and that the measuring insert thus formed can then be inserted into the housing.

Flow meters, especially ultrasonic meters, typically show dependence between the measured variables and a flow profile in the measurement zone. There is therefore a known practice of providing flow straighteners in the housing upstream and/or downstream of the measurement section in order to influence the flow profile in the measurement zone. Corresponding flow straighteners, which can be of screen-type design for example, can be mounted independently of the measuring insert in the region of an inlet opening and/or of an outlet opening of the housing. However, this is problematic if flowmeters with different housing sizes and/or different lengths of flow passage are to be provided since, in this case, the flow straighteners are at different distances from the measurement zone, which can lead, in turn, to different flow profiles in the measurement zone.

SUMMARY OF THE INVENTION

It is therefore the underlying object of the invention to allow improved flow straightening in a flowmeter in combination, at the same time, with a construction which is as simple as possible and, in particular, simplicity of adaptation of the housing configuration.

According to the invention, the object is achieved by a flow meter of the type stated at the outset, wherein a respective flow straightener having at least one aperture through which the fluid can flow is arranged between the inlet opening and the measuring tube and/or between the measuring tube and the outlet opening. The flow straightener is designed as a separate component part, which is secured on the holding device by a force-locking or form-locking joint.

It is proposed to secure a flow straightener force-locking or form-locking on a holding device which retains the measuring tube on the housing. On the one hand, this ensures that the flow straightener can always be arranged at the same distance from the measuring tube or measurement zone, irrespective of a length of the flow passage, without modifying other components or requiring a complex configuration of the housing to retain the flow straightener. In particular, the holding device, the measuring tube and the flow straightener and, optionally, further components, e.g. reflection elements for ultrasound waves, can together form a measuring insert which, after assembly, can be inserted as a unit into the flow passage. The construction of the flow meter can thus be carried out in a small number of simple steps.

The separate formation of the flow straightener furthermore increases flexibility in the construction of the flow meter. It may be advantageous, for example, to use different flow straighteners for different geometries of the flow passage, different flow rates etc. With the flow meter according to the invention, it is sufficient in this case to use a correspondingly adapted flow straightener. The other components do not have to be modified. In some cases, on the other hand, it may also be advantageous, for example, to use a different measuring tube. This too is possible without problems with the flow meter according to the invention without having to modify the other components. The flow meter according to the invention is thus of highly modular construction, this being advantageous, for example, if flow meters are to be produced for a large number of applications.

The flow straightener can be, in particular, a type of screen which extends substantially over the entire flow cross section of the flow passage and subdivides it into a plurality of flow zones through the provision of a plurality of apertures. For example, the flow straightener can be formed by a flange which extends in the circumferential direction of the flow passage, and the region within this flange can be subdivided by a plurality of walls. In this case, it is possible, in particular, for the apertures to have approximately the shape of circular segments, wherein these circular segments can be further subdivided by one or more concentric annular walls. The various apertures can have approximately the same flow cross section, but it is also possible to provide flow cross sections of significantly different size.

A flow straightener of this kind or a screen of this kind can be used, in particular, to avoid inflow disturbances. However, it may also be advantageous to straighten the flow in the outflow zone.

The flow meter preferably has a measuring device for detecting a speed of flow in a measurement zone. For example, ultrasonic transducers, which transmit ultrasound waves into the fluid or receive ultrasound waves from the fluid, can be provided upstream and down-stream of the measuring tube. By measurement of propagation times between the ultra-sonic transducers or propagation time differences between the two directions of transmission, a speed of flow and thus, where the flow cross section is known, a flow volume can be determined. The ultrasonic transducers can be secured in or on the housing and can transmit or receive ultrasound waves substantially perpendicularly to the flow direction. The deflection of the ultrasound waves for guidance through the measuring tube can be accomplished by reflection elements, which are arranged in the flow path. The detection of propagation times and the calculation of flow rates can be accomplished by a corresponding control device. Corresponding devices are known in the prior art and will therefore not be explained in detail.

The measuring tube delimits the flow cross section in the measurement zone, preferably on all sides. It can be round on the inside and/or outside, but it can also be angular or have other structures for the inner or outer wall.

The measuring tube, the housing, the holding device and the flow straightener are each preferably separate component parts or groups of component parts, which are assembled by force-locking or form-locking engagement, e.g. by latching, during the construction of the flow meter.

The flow straightener can be arranged at a distance from the measuring tube. The flow straightener can rest at the edges against the walls of the flow passage or can at least approximately span the entire cross section of the flow passage. The connection between the flow straightener and the holding device can preferably be made in the region of the centre of the flow cross section of the flow passage. As a supplementary or alternative measure, additional joints, which are spaced apart from the centre of the flow cross section, can be provided.

In particular, the flow meter can be used to measure a flow of a liquid, in particular water. In the case of water meters, there is a need to be able to measure with high precision and in a highly dynamic way. Moreover, these appliances should be very robust in relation to internal and external disturbances. This imposes demanding requirements on flow guidance, which can be met by the construction according to the invention of the flow meter. The measuring insert to be inserted into the housing, which contains the holding device, the measuring tube and the flow straightener, and which can optionally have reflection elements in addition, is both simple to assemble by hand and also suitable for fully automatic assembly by virtue of the construction according to the invention.

The holding device can project beyond the measuring tube in the direction of the inlet opening and/or the outlet opening and/or can fit around the measuring tube in the circumferential direction of the measuring tube. The connecting section on which the flow straightener engages is preferably arranged on a section of the holding device which projects beyond the measuring tube in the direction of the inlet opening and/or the outlet opening. The flow straightener can thus be arranged at a defined distance from the measuring tube. In particular, the holding device can fit completely around the measuring tube. In at least one section of the measuring tube, the measuring tube can be completely surrounded by the holding device at the circumference.

An inlet-side reflection element can be arranged in the inlet passage between the inlet opening and the measuring tube, and an outlet-side reflection element can be arranged in the inlet passage between the measuring tube and the outlet opening, wherein the inlet-side and the outlet-side reflection elements are used to guide ultrasound waves from a first to a second ultrasonic transducer. The flow straightener is arranged between the inlet opening and the inlet-side reflection element or between the outlet-side reflection element and the outlet opening and projects beyond the holding device. This makes it possible to prevent the flow straightener from disturbing or influencing the propagation of the ultrasound waves in the measurement zone. If flow straighteners are provided both on the inlet side and on the outlet side, these can both be arranged outside the measurement zone situated between the reflection elements.

The inlet-side and/or the outlet-side reflection element can be retained on the holding device, in particular form-lockingly by holding protrusions on the respective reflection element, or can be formed by the holding device. In this case, the holding device with the components arranged thereon or therein can together form a measuring insert which, apart from the ultrasonic transducers, has all the components relevant to measurement and has only to be inserted into the housing. On its side facing the fluid, the respective reflection element can end flush with the holding device, thus ensuring that no step affecting flow is formed between the respective reflection element and the holding device.

The flow straightener can make contact with the holding device in a coupling region in order to form the non-positive or positive joint, wherein the coupling region is spaced apart from the side walls of the flow passage. In particular, the coupling region can be arranged substantially centrally in the flow cross section. The coupling region is preferably arranged upstream or downstream of a respective reflection element in the flow direction. Connection in the region of the center of the flow cross section necessarily results in an obstacle to flow in this region. Retardation of the flow in the central region can be advantageous in order to form a uniform flow profile.

The holding device can contain a first and a second holding component, which are connected to one another force-locking or form-locking. The connection can be made, in particular, by latching. A corresponding two-part construction is advantageous if the holding device is supposed to fit completely around the measuring tube at the circumference. For example, the measuring tube can be placed in one holding component and secured or guided by attaching the second holding component. A similar statement also applies to the reflection elements. These can be placed in receptacles of one of the holding devices, for example, and retained by bringing the two holding devices together or, if they are already retained on one of the holding components, additionally secured.

The first holding component can have at least one first latching element, and the second holding component can have at least one second latching element, which are latched in pairs in the circumferential direction of the flow passage in order to connect the first and the second holding component to one another. The respective first latching element has a projection in the radial direction of the flow passage, which projection extends in the circumferential direction of the flow passage as far as an end of the respective first latching element which faces the second holding component. The respective second latching element has a groove for guiding the projection as part of the latching of the respective latching elements, or vice versa. Several pairs of latching elements are preferably provided to connect the holding components. In particular, the groove can be a groove which passes through a latching hook of the second latching element. The projection can project from the first holding element in the direction of the center of the flow passage or in the direction of the wall of the flow passage. During assembly, the projection and the groove can be used to guide the holding components relative to one another in the longitudinal direction of the flow passage and of the measuring tube. Accurately positioned assembly of the holding components is thereby possible without further aids. It is also possible for a plurality of projections or for any desired elongate contour aligned in the assembly direction to be used. Guidance by a tongue and groove joint is thus achieved during assembly.

The latching elements can be arranged in a rear space of the measuring tube, which is to say between the measuring tube and the wall of the flow passage. This region can be connected fluidically to the region between the measuring tube and the outlet opening. For example, the measuring tube can be sealed off in a fluid tight manner with respect to the wall of the flow passage on the inlet opening side and can end freely in the flow passage in the region of the outlet opening.

The first holding component and the flow straightener can be connected positively, wherein the first holding component and the flow straightener are designed in such a way that the relative position and orientation thereof are fixed solely by their positive connection. During the mounting of the flow straightener on the first holding component, the flow straightener can be held by a means integrated into the holding component, e.g. by a snap hook, with the result that the component parts can no longer fall apart until assembly is complete through connection of the first and the second holding component. The second holding component can secure the connection between the first holding component and the flow straightener. For example, the movement of a means, e.g. a snap hook, which retains the flow straightener on the first holding component can be restricted by the connection of the first holding component to the second holding component, e.g. by introducing a locking element into a range of movement of the means. It is thus possible, for example, to prevent the flow straightener from being decoupled from the first holding component without the first holding component first being decoupled from the second holding component. If, at the same time, the holding components are designed in such a way that separation within the flow passage is not possible, it is thereby also ensured that the flow straightener cannot be detached from the holding device while this device is situated in the flow passage.

The first and/or the second holding component and/or the or a reflection element for reflecting ultrasound waves has/have a holding device, by means of which the reflection element is retained form-lockingly or force-lockingly on the first and/or the second holding component. In particular, the holding element is configured in such a way that the reflection element can be retained on the first and/or second holding component even before the first holding component is connected to the second holding component. This facilitates the production of the flow meter since the reflection element can be secured initially on the first or the second holding component and does not have to be retained, e.g. by means of a separate tool, until the holding components are joined together. In other words, the holding device can fix the reflection element on the first and/or second holding component in such a way that the subassembly can be assembled without further aids.

The reflection element can be retained by the holding device or the first and/or second holding component in such a way that a flush surface is obtained. It is thereby possible to improve flow guidance in the region of the reflection element.

The form-lockingly or force-lockingly connection can be formed between the or a coupling region of the holding device or the first and/or the second holding component and a coupling section of the flow straightener, wherein the coupling region and the coupling section are formed in such a way that the flow straightener can be connected in just one orientation to the holding device or to the first and/or the second holding component. This means that, in the case of separation, assembly would be possible only with the same relative orientation. This ensures that just one possible alignment between the flow straightener and the holding device is defined during the production of the flowmeter simply by the appropriate configuration of the components. During production, it is thus possible to implement the "pokayoke" principle, according to which errors are prevented through appropriate technical design of the production process or of the components used during the production process.

The flow straightener can be configured in such a way that a front face of the flow straightener facing away from the measuring tube has neither rotational symmetry nor n-fold rotational symmetry. Here, n-fold rotational symmetry should be taken to mean symmetry where the front face would appear the same when rotated through a particular angle of less than 360°. In particular, the flow straightener has a plurality of apertures, which all lie within an edge wall running around the flow straightener in the circumferential direction, in particular in a substantially rotationally symmetrical manner. The individual apertures can be separated by an aperture wall arrangement which has neither rotational symmetry nor n-fold rotational symmetry. In particular, the aperture wall arrangement can subdivide the flow cross section into a plurality of circular segments and can subdivide these segments into further partial segments. The subdivision into further partial segments can be brought about, for example, by providing an additional wall in the form of an inner ring. In this case, the wall shape can deviate from this ring shape in one or more segments in order to interrupt the rotational or n-fold rotational symmetry.

The avoidance of rotational and n-fold rotational symmetry in the front face serves, in particular, for the implementation of the pokayoke principle already explained. If an assembled measuring insert containing, for example, the holding device, the measuring tube and the flow straightener is to be inserted into the housing from the inlet-opening side, for example, and the flow straightener is to be arranged between the inlet opening and the measuring tube, the flow straightener of the measuring insert can be gripped for this purpose by means of an assembly ram. By matching the assembly ram to the shape of the front face it is possible, by virtue of the interrupted rotational and n-fold rotational symmetry, to achieve a clear orientation of the assembly ram relative to the flow straightener and thus to the overall measuring insert when the assembly ram engages on the flow straightener. Thus, all that is required during the assembly process is to decide a defined alignment of the housing relative to the assembly ram in order to insert the measuring insert into the housing in a defined orientation. Possible misalignments due to incorrect gripping of the flow straightener by an assembly ram can thus be prevented.

The holding device can have at least one projection, which engages in a recess in a side wall of the flow passage or vice versa, and/or the flow passage can have, on the outlet side, a shoulder, on which the holding device rests. The recess can run around in the circumferential direction of the flow passage, as a result of which the engagement of the projection in the recess can be used exclusively to fix the position of the holding device in the longitudinal direction of the flow passage. However, the recess is preferably limited in the circumferential direction, with the result that a rotation of the holding device relative to the flow passage is also prevented. In particular, the projection can be formed by an elastic latching element which engages in the recess. If the holding device, in particular with the measuring tube and flow straightener arranged thereon, is inserted into the flow passage in the correct alignment, the latching element latches into the recess and thus secures the holding device and hence also the measuring tube and the flow straightener in the correct alignment in the flow passage. As an alternative or supplementary measure, the position of the holding device in the longitudinal direction of the flow passage can be fixed by seating it on the shoulder.

A translation and/or rotation of the measuring tube relative to the holding device can be blocked by a blocking device of the measuring tube and/or of the holding device. For example, the measuring tube can have a collar which rests against a rim of the holding device. A rotation of the measuring tube and the holding device relative to one another can be blocked by shaping the collar and by struts or projections on the holding device.

The blocking device can be arranged in such a way in the circumferential direction of the measuring tube that they define just one set orientation of the measuring tube relative to the holding device. By means of a non-uniform distribution of the blocking device in the circumferential direction of the flow passage or holding device it is possible to interrupt any rotational or n-fold rotational symmetry, thereby allowing arrangement of the measuring tube on the holding device only in the set orientation. The pokayoke principle is thereby also implemented in respect of the relative orientation of the measuring tube and the holding device.

It is possible for the flow cross section of the measuring tube not to be rotationally symmetrical. For example, the side wall of the measuring tube can have an undulating profile, the measuring tube can end at an earlier point or be extended in certain sections of the circumference etc. In these cases precise definition of the orientation of the measuring tube relative to the flow passage and the flow straightener is essential, it being possible to implement this reliably and without the possibility of error in the assembly of the flow meter by the procedure described above.

The holding device can have at least one centering device, which is supported on the wall of the flow passage and/or at least one centering device can be arranged between the holding device and the wall of the flow passage, wherein the centering device is elastically preloaded. It is thereby possible to specify a defined position of the holding device and of the components arranged thereon relative to the flow passage. The centering device can, for example, be an O-ring composed of an elastomer, which runs around the circumference of the holding device or is arranged in the measuring tube. However, the centering device is preferably part of the holding device.

The holding device can have a plurality of elastically deformable spring elements spaced apart in the circumferential direction of the flow passage as the centering device, which press a respective contact section against the wall of the flow passage by virtue of their restoring force. Through the design of the centering device as part of the holding device, it is possible to make a further reduction in the effort involved in assembling the flow meter.

In addition to the flow meter according to the invention, the invention relates to a method for producing a flow meter for detecting a flow rate of a fluid. The method includes the steps of:

making available a housing having a flow passage, through which the fluid can be guided from an inlet opening of the housing to an outlet opening of the housing, a measuring tube, a flow straightener having at least one aperture through which the fluid can flow, and a holding device or two holding components, from which the holding device is assembled, as separate component parts, mounting the measuring tube and the flow straightener on the holding device, wherein the flow straightener is secured on the holding device by a form-lockingly or force lockingly joint, and inserting the holding device, with the measuring tube secured thereon, and the flow straightener into the flow channel of the housing, such that the flow straightener is arranged between the inlet opening and the measuring tube or between the measuring tube and the outlet opening, and that the flow cross section of the flow passage is constricted by the measuring tube in one section.

The method according to the invention can be refined by means of the features explained in connection with the flow meter according to the invention, with the advantages mentioned there.

The flow straightener can be secured on the holding device by first of all connecting the flow straightener to the first holding component. In particular, the flow straightener can be connected form-lockingly or force lockingly to the holding component. The connection can be made in such a way that the position and orientation of the flow straightener relative to the first holding component is clearly defined by the connection. The second holding component can then be connected to the first holding component. It is thereby optionally possible to secure the connection of the first holding component to the flow straightener, as has already been explained in relation to the flow meter according to the invention.

The measuring tube can be connected to the holding device by first of all placing the holding device in the first or second holding component or connecting it to the component form-lockingly or force lockingly, after which the holding components are connected.

If a flow meter is produced with reflection elements for the reflection of ultrasound waves, it is possible to design these reflection elements as part of the holding device. However, the reflection elements are preferably also produced as separate components and coupled to the holding device during the production of the flow meter. For this purpose, the first and/or the second holding component can have a recess in which the reflection element can be placed. In particular, after being placed in the recess, the reflection element is connected form-lockingly or force lockingly to this holding component, thus enabling assembly to be continued without further securing the reflection element. This can be accomplished, for example, by providing a latching element, e.g. a latching hook, on the reflection element, the element or hook latching onto the first or second holding component or vice versa. The recess can be configured in such a way that the reflection element is pressed against at least one holding protrusion of the holding component and forms a flush surface therewith. After the insertion or retention of the reflection element, it can be secured during the assembly of the holding components, e.g. by engaging in recesses in both holding components.

Mounting the measuring tube and the flow straightener and, optionally, reflection elements on the holding device forms a measuring insert which can be inserted as a unit into the flow passage of the measuring tube. For this purpose, the flow straightener of the measuring insert can be gripped by an assembly ram. For this purpose, it is particularly advantageous if the front side of the flow straightener has neither rotational nor n-fold rotational symmetry, as explained above, with the result that it can be gripped only in one defined orientation by the assembly ram.

In order to define the position of the measuring insert relative to the flow passage, an elastically deformable projection, e.g. a snap-in bar, can be used, this being arranged on the holding device and engaging in a recess in the wall of the flow passage. After insertion into the flow passage, the holding device and thus the entire measuring insert is thereby automatically secured, and the assembly of the measuring tube, the flow straightener and, optionally, the reflection element is concluded. The assembly of the flowmeter can then be concluded by arranging ultrasonic transducers in or on the housing and attaching associated control electronics and operating and/or readout means.

When reading the claim language, the following definitions apply. When the claim language recites A and/or B it means A alone, B alone or A and B. When the claim language recites at least one of A and B it means A alone, B alone or A and B. When the claim language recites at least one of A or B it means A alone, B alone or A and B. When the claim language recites a form-locking connection, it is a connection that connects two elements together due to the shape of the elements themselves (e.g. ball and socket), as opposed to a force-locking connection, which locks the elements together by force external to the elements (e.g. screw).

Other features which are considered as characteristic for the invention are set forth in the appended claims.

Although the invention is illustrated and described herein as embodied in a flow meter and method for producing a flow meter, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
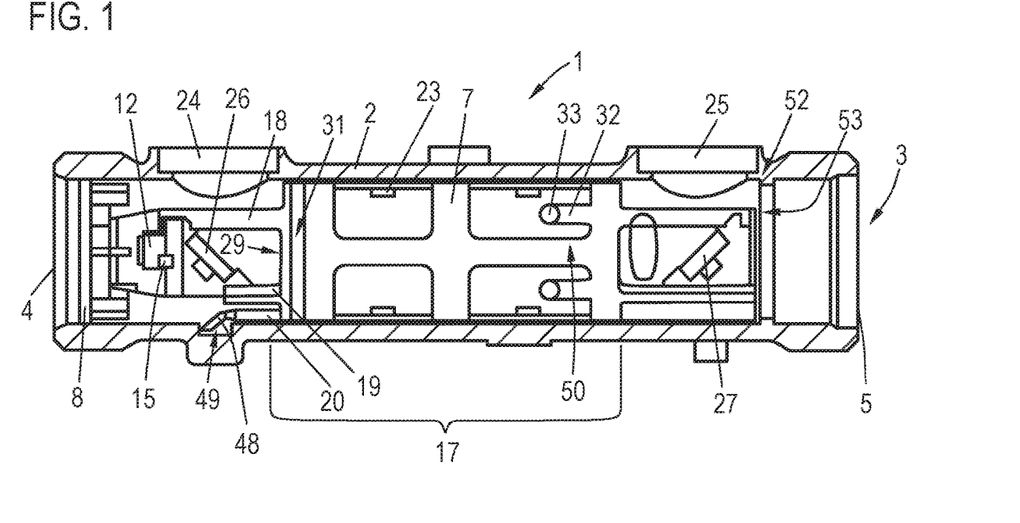
FIG. 1 is a diagrammatic, sectional view of an illustrative embodiment of a flow meter according to the invention, wherein the measuring tube is not shown for reasons of clarity.

Referring now to the figures of the drawings in detail and first, particularly to FIG. 1 thereof, there is shown a flow meter 1 for detecting a flow rate of a fluid. A housing 2 of the flow meter has a flow passage 3, through which the fluid can flow and which extends from an inlet opening 4 to an outlet opening 5. The flow meter 1 is an ultrasonic meter. In this case, ultrasound waves are emitted by a first ultrasonic transducer 24 and received by a second ultrasonic transducer 25 and vice versa. From a difference in propagation time it is possible to calculate a speed of flow and thus, if the flow cross section is known, a flow rate. Control of the ultrasonic meters 24, 25 and measurement data acquisition and processing are performed by a non-illustrated control device. In order to pass the ultrasound waves through the flow passage substantially parallel to the flow direction, the flow meter 1 furthermore has reflection elements 26, 27.

Figure 4:
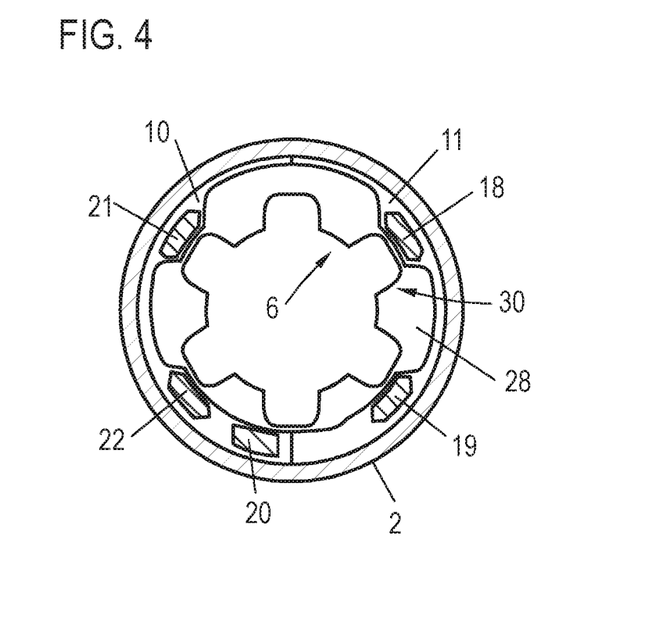
FIG. 4 is a sectional view of the flow meter shown in FIG. 1, which shows the arrangement of the measuring tube in a holding device.

In order to allow more precise measurement of the flow, the flow meter 1 has a non-illustrated measuring tube 6, which restricts the flow cross section in a section 17 of the flow passage 3. For reasons of clarity, the measuring tube 6 is not shown in FIG. 1. Instead, FIG. 4 shows a detail view which illustrates the retention of the measuring tube 6 by a holding device 7. This is explained in greater detail below.

The flow meter 1 can be used to measure a water flow. In this case, it is essential that it has a high robustness to internal and external disturbing influences. In order to mitigate the influence of disturbances and to straighten the flow profile, the flow meter 1 has a flow straightener 8. This is illustrated in detail in FIG. 2. The flow straightener 8, which can also be referred to as a screen, extends substantially over the entire flow cross section of the flow passage 3 and subdivides the passage by means of its several apertures 9 into different partial flow regions.

In principle, the measuring insert, which contains the holding device 7, the reflection elements 26, 27 arranged thereon, the measuring tube 6 and the flow straightener 8, can be used in various housings 2. To ensure that the flow straightener 8 is in a defined position relative to the holding device 7 and thus relative to the measuring tube 6, even in the case of different housings lengths, the flow straightener 8 is secured positively on the holding device 7. This is illustrated in detail in FIG. 3, which shows a sectioned view of the holding device 7 and of the flow straightener 8. As will be explained in greater detail below, the holding device 7 contains two holding components 10, 11, which each approximately form a half cylinder in the region of the measuring tube 6. In FIG. 1, holding component 11 faces the observer, while holding component 10 faces the observer in FIG. 3.

Figure 3:
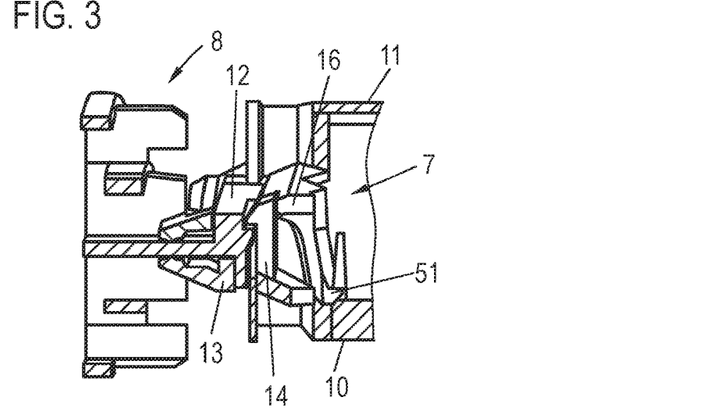
FIG. 3 is a sectional view, which shows the securing of the flow straightener in the flow meter shown in FIG. 1.

The flow straightener 8 is first of all secured on holding component 10. For this purpose, the flow straightener 8 has a coupling section 12, which, when viewed in cross section, is arranged substantially centrally on the flow straightener 8 and projects from the flow straightener 8 in the direction of the measuring tube. In the installed state, this is contacted by coupling regions 13, 14, which are illustrated in FIG. 3, and by coupling region 15, which is illustrated in FIG. 1. In this case, coupling region 14 is designed as a snap hook, with the result that the flow straightener 8 latches on holding component 10. After latching, the position and orientation of the flow straightener 8 relative to the holding component 10 is defined in a fixed manner since the coupling section 12 is supported on all sides by the coupling regions 13, 14, 15.

This connection can be additionally secured if, as will be explained in greater detail below, the two holding components 10, 11 are connected. After connection, section 16 of the second holding component 11 engages behind coupling region 14 of the holding device, i.e. the snap hook, and therefore limits the mobility thereof. As a result, the latched connection between the flow straightener 8 and the first holding component 10 cannot be released without first separating the holding components 10, 11. This is not possible within the housing 2 owing to the half-cylinder shape of the holding components 10, 11, and therefore the flow straightener 8 is reliably secured against separation from the holding device 7. To reliably secure the connection of the holding components 10, 11, an additional latching measure can furthermore be implemented in region 51.

FIG. 4 shows the arrangement of the measuring tube 6 on the holding device 7. The measuring tube 6 is preferably placed in one of the holding components 10, 11 before the assembly of these holding components and is locked form-lockingly or force-lockingly by the connection of the holding components 10, 11. The position of the measuring tube 6 in the flow direction of the flow meter 1 is defined by the fact that a collar 28 of the measuring tube rests on the rim 29 (shown in FIG. 1) of the holding device 7. Since the measuring tube is not rotationally symmetrical owing to the recesses 30 provided to improve the flow behavior, the construction of the measuring tube 6 and of the holding device 7 ensures that the measuring tube 6 can only be mounted in a defined position on the holding device 7 and is also secured in this position. To achieve this, the collar 28 has recesses which correspond to the positions of the blocking devices 18 to 22 of the holding device 7. The blocking devices 18 to 22 are formed by struts on the holding device 7, which are passed through the recesses in the collar 28.

In order to seal off the measuring tube 6 on the inflow side, the holding device 7 has an encircling groove 31, into which an O-ring (not shown) composed of an elastomer is inserted in order to seal off the holding device 7 and thus also the measuring tube 6 on the inlet side, ensuring that the rear space of the measuring tube, which surrounds the measuring tube, is connected to the inlet opening 4 exclusively via the measuring tube 6. The O-ring serves simultaneously to center the holding device 7 and thus the measuring tube on the inlet side. To center the holding device and thus the measuring tube on the outlet side, a plurality of moldable spring elements 32 are provided as centering devices 50 on the holding device 7, these spring elements being preloaded by the side wall of the flow passage 3 after the arrangement of the holding device in the housing 2, with respective contact sections 33 pressing against the wall of the flow passage.

Figure 5:
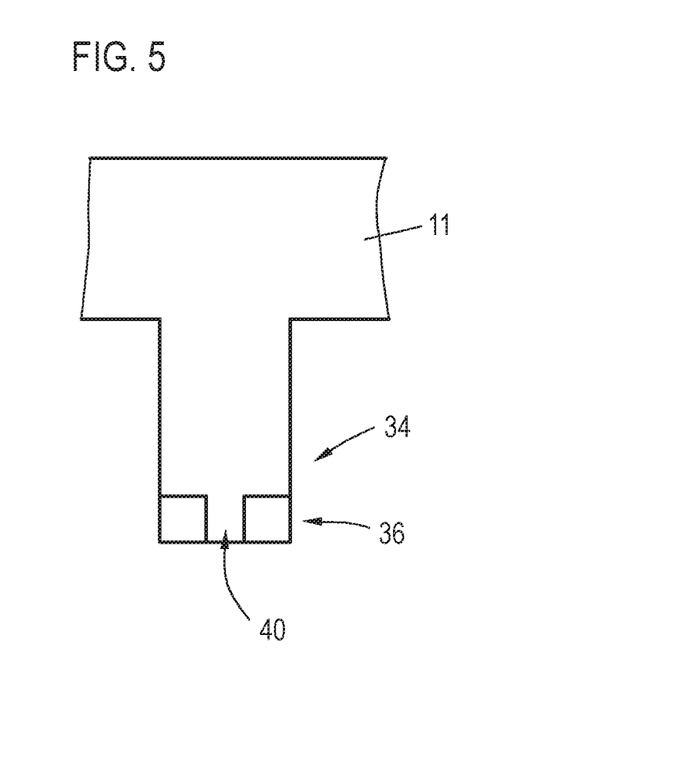
FIGS. 5 and 6 are illustrations of latching elements for connecting holding components of the holding device in the flow meter shown in FIG. 1.
Figure 6:
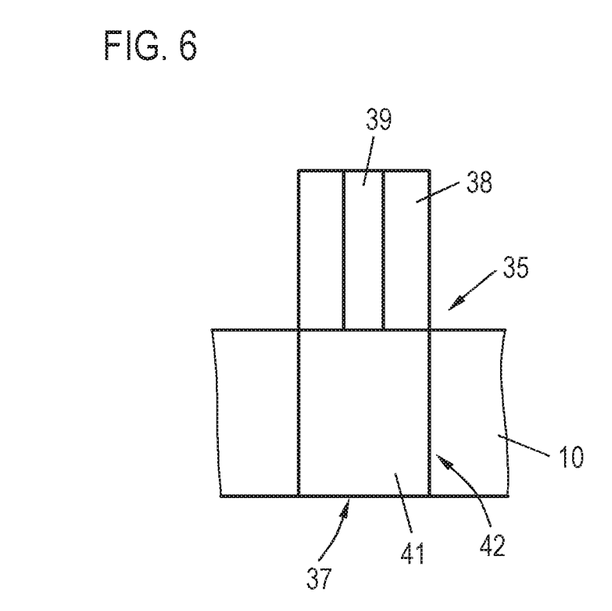

After the flow straightener 8, the measuring tube 6 and the reflection elements 26 have been arranged on the holding components 10, 11, they can be connected to one another. The connection of the holding components 10, 11 to the holding device 7 is accomplished by means of four latching joints 23, which are shown in FIG. 1. In this case, a latching element 34 of holding component 11 in each case latches with a latching element 35 in holding component 10. These elements are illustrated in FIGS. 5 and 6, wherein FIG. 5 shows the radially inner side of latching element 34 and FIG. 6 shows the radially outer side of latching element 35. Latching is accomplished by guiding a latching hook 36 in the circumferential direction until it latches in on the edge 37. During this process, the latching hook 36 is first of all guided along an oblique plane 38 in order to lift it. During this process, guidance is performed by the projection 39 being guided by the groove 40. As soon as the latching hook 36 reaches the plateau 41, it is guided onward by laterally raised regions 42. This arrangement allows simple correctly positioned assembly of holding components 10, 11 on one another without the need for additional tools.

Figure 7:
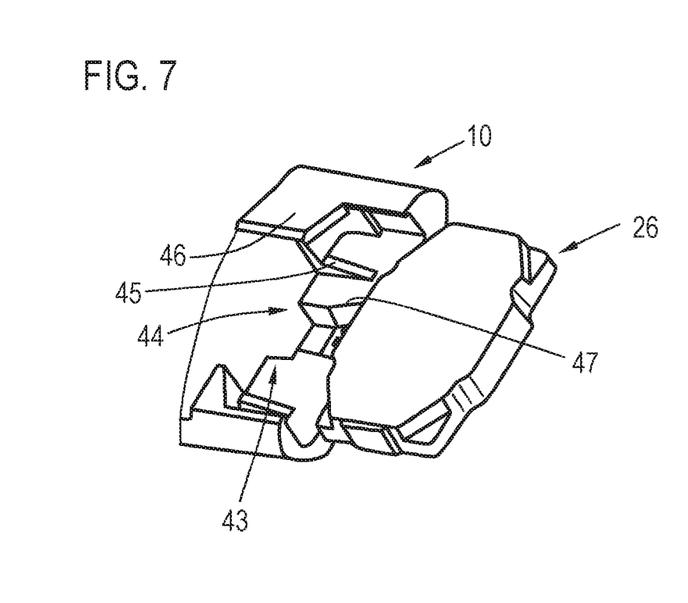
FIG. 7 is an exploded, perspective view which schematically shows a retention of a reflection element on the holding component in the flow meter shown in FIG. 1.

In principle, the reflection elements 26, 27 can be designed as part of the holding device 7. Preferably, however, they are first of all manufactured as separate component parts and then secured on the holding device 7 or at least on one of the holding components 10, 11. For this purpose, the holding device 10 has a holding device 43, namely a recess, to receive reflection element 26, as illustrated in FIG. 7. Reflection element 26 can be inserted into this recess and retained there form-lockingly or force-lockingly. Form-locking engagement can be achieved, for example, by lifting a latching hook (not shown) or a holding protrusion (not shown) of reflection element 26 along the ramp 47 so that it hooks onto the edge 44. By means of the ramps 45, reflection element 26 can be pressed against retaining elements 46, which preferably rest on reflection element 26 in such a way that a flush surface is obtained.

It is possible that only holding component 10 retains reflection element 26 after the assembly of holding components 10, 11. However, reflection element 26 is preferably additionally support or retained against removal by a holding element of holding component 11.

Figure 2:
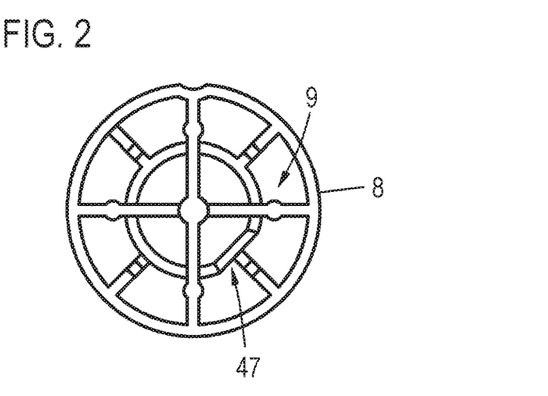
FIG. 2 is a front view of the flow straightener used in the flow meter shown in FIG. 1.

After the measuring tube 6, flow straightener 8 and, optionally, reflection elements 26, 27 have been arranged on holding components 10, 11 and these have been assembled to form the holding device 7, an easily handled measuring insert, which can be inserted as a unit into the housing 2 or into the flow passage 3, is available. If insertion takes place from the side of the inlet opening 4, handling only from the side of the flow straightener 8 is possible during the insertion. The flow straightener can be gripped from its front side (shown in FIG. 2) by an assembly ram in order to insert the measuring insert into the flow passage 3. In order to ensure that the measuring insert is inserted in the correct alignment during this process, the n-fold rotational symmetry of the flow straightener 8 is interrupted by the straight wall section 47, as illustrated in FIG. 2, whereby, given appropriate configuration of the assembly ram, the flow straightener 8 and thus the measuring insert can be gripped only in a defined orientation relative to the assembly ram.

In order to hold the measuring insert in a defined position and alignment after insertion into the housing 2, the housing 2 has a depression 49, in which a projection 48 of the holding device 7 can engage. By virtue of support on a flexible strut, the projection 48 is capable of bending elastically and thus forms a latching protrusion which latches in as soon as the holding device 7 and thus the entire measuring insert is in the correct position. The position of the measuring insert is furthermore stabilized by the fact that an edge 53 of the holding device 7 is seated on a shoulder 52 formed on the outlet side in the flow passage.

Before or after the insertion of the measuring insert, the ultrasonic transducers 24, 25 can be arranged on the housing 2, and a control device and indication and an operating device can be added in order to finish the flow meter 1. The described construction of the flow-meter 1 thus allows a particularly simple construction of a high-grade flow meter 1.

The following is a summary list of reference numerals and the corresponding structure used in the above description of the invention:

1 flow meter
2 housing
3 flow passage
4 inlet opening
5 outlet opening
6 measuring tube
7 holding device 8 flow straightener
9 aperture
10 holding component
11 holding component
12 coupling section
13 coupling region
14 coupling region
15 coupling region
16 section
17 section
18 blocking device
19 blocking device
20 blocking device
21 blocking device
22 blocking device
23 latching connection
24 ultrasonic transducer
25 ultrasonic transducer
26 reflection element
27 reflection element
28 collar
29 flange
30 recess
31 groove
32 spring element
33 contact section
34 latching element
35 latching element
36 latching hook
37 edge
38 plane
39 projection
40 groove
41 plateau
42 region
43 holding device
44 edge
45 ramp
46 retaining element
47 ramp
48 projection
49 recess
50 centering device
51 region
52 shoulder
53 edge

The invention claimed is:

1. A flow meter for detecting a flow rate of a fluid, comprising:
a housing having an inlet opening, an outlet opening and a flow passage formed therein and, through said flow passage the fluid can be guided from said inlet opening of said housing to said outlet opening of said housing;
a measuring tube disposed in said flow passage and constricting a flow cross section in one section of said flow passage;
a holding device by which said measuring tube is retained on said housing; and
a flow straightener having at least one aperture formed therein and through which the fluid can flow is disposed between said inlet opening and said measuring tube and/or between said measuring tube and said outlet opening, said flow straightener is configured as a separate component, which is secured on said holding device by a form-lockingly or force-lockingly connection.

2. The flow meter according to claim 1, further comprising:
first and second ultrasonic transducers;
an inlet-side reflection element disposed in said flow passage between said inlet opening and said measuring tube; and
an outlet-side reflection element disposed in said flow passage between said measuring tube and said outlet opening, said inlet-side and said outlet-side reflection elements are used to guide ultrasound waves from said first ultrasonic transducer to said second ultrasonic transducer, wherein said flow straightener is disposed between said inlet opening and said inlet-side reflection element or between said outlet-side reflection element and said outlet opening and projects beyond said holding device in a longitudinal direction of said flow passage.

3. The flow meter according to claim 2,
further comprising holding protrusions; and
wherein at least one of said inlet-side reflection element or said outlet-side reflection element is retained on said holding device, form-lockingly by means of said holding protrusions disposed on said inlet-side reflection element and said outlet-side reflection element, or is formed by said holding device.

4. The flow meter according to claim 2, wherein:
said flow passage has side walls; and
said flow straightener makes contact with said holding device in a coupling region to form said form-lockingly or force-lockingly connection, wherein said coupling region is spaced apart from said side walls of said flow passage.

5. The flow meter according to claim 4, wherein said holding device has a first holding component and a second holding component which are connected to one another form-lockingly or force-lockingly.

6. The flow meter according to claim 5, wherein:
said first holding component has at least one first latching element;
said second holding component has at least one second latching element, said first and second holding components are latched in pairs in a circumferential direction of said flow passage to connect said first and second holding components to one another; and
said first latching element has a projection in a radial direction of said flow passage, said projection extends in the circumferential direction of said flow passage as far as an end of said first latching element which faces said second holding component and said second latching element has a groove formed therein for guiding said projection as part of a latching of said first and second latching elements, or vice versa.

7. The flow meter according to claim 5, wherein:
said first holding component and said flow straightener are connected form-lockingly;
said first holding component and said flow straightener are configured such that a relative position and orientation thereof are fixed solely by said form-locking connection.

8. The flow meter according to claim 5, wherein at least one of said first holding component, said second holding component, said inlet-side reflection element or said outlet-side reflection element for reflecting the ultrasound waves has a further holding device, by which said inlet-side reflection element or said outlet-side reflection element is retained form-lockingly or force-lockingly on at least one of said first holding component or said second holding component.

9. The flow meter according to claim 4, wherein:
- a form-locking or force-locking connection is formed between said coupling region of said holding device or said first holding component and/or said second holding component and a coupling section of said flow straightener; and
- wherein said coupling region and said coupling section are formed such that said flow straightener can be connected in just one orientation to said holding device or to said first holding component and/or said second holding component.

10. The flow meter according to claim 1, wherein said flow straightener has a front face facing away from said measuring tube and has neither rotational symmetry nor n-fold rotational symmetry.

11. The flow meter according to claim 1, wherein:
- said flow passage has a side wall with a recess formed therein; and
- said holding device has at least one projection, which engages in said recess in said side wall of said flow passage; and/or
- said flow passage has, on an outlet side, a shoulder, on which said holding device rests.

12. The flow meter according to claim 1, further comprising blocking devices disposed on said measuring tube or said holding device, wherein a translation and/or a rotation of said measuring tube relative to said holding device is blocked by said blocking devices of said measuring tube and/or of said holding device.

13. The flow meter according to claim 12, wherein said blocking devices are disposed such that in a circumferential direction of said measuring tube said blocking devices define just one set orientation of said measuring tube relative to said holding device.

14. The flow meter according to claim 1, wherein said holding device has at least one centering device supported on a wall of said flow passage and/or in that said at least one centering device is disposed between said holding device and said wall of said flow passage, wherein said centering device is elastically preloaded.

15. The flow meter according to claim 14, wherein said holding device has a plurality of elastically deformable spring elements spaced apart in a circumferential direction of said flow passage as said centering device, which press a respective contact section against said wall of said flow passage by virtue of a restoring force.

16. The flow meter according to claim 1, wherein:
- said holding device has a side wall with a recess formed therein; and
- said flow passage has at least one projection, which engages in said recess in said side wall of said holding device; and/or
- said flow passage has, on an outlet side, a shoulder, on which said holding device rests.

17. A method for producing a flow meter for detecting a flow rate of a fluid, which comprises the steps of:
- making available a housing having a flow passage, through which the fluid can be guided from an inlet opening of the housing to an outlet opening of the housing;
- providing a measuring tube;
- providing a flow straightener having at least one aperture through which the fluid can flow;
- providing a holding device or two holding components, from which said holding device is assembled, as separate component parts;
- mounting the measuring tube and the flow straightener on the holding device, wherein the flow straightener is secured on the holding device by a form-locking or force-locking connection; and
- inserting the holding device, with the measuring tube secured thereon, and the flow straightener into the flow channel of the housing, such that the flow straightener is disposed between the inlet opening and the measuring tube or between the measuring tube and the outlet opening, and that a flow cross section of the flow passage is constricted by the measuring tube in one section.

* * * * *